(12) United States Patent
Obara et al.

(10) Patent No.: US 7,436,612 B2
(45) Date of Patent: Oct. 14, 2008

(54) STORAGE APPARATUS, STORAGE APPARATUS CONTROL METHOD, AND COMPUTER PRODUCT

(75) Inventors: Yoshifumi Obara, Kawasaki (JP); Takao Abe, Kawasaki (JP); Takeshi Hara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 285 days.

(21) Appl. No.: 11/315,946

(22) Filed: Dec. 22, 2005

(65) Prior Publication Data

US 2007/0064329 A1 Mar. 22, 2007

(30) Foreign Application Priority Data

Sep. 21, 2005 (JP) ............................. 2005-274562

(51) Int. Cl.
*G11B 5/09* (2006.01)
(52) U.S. Cl. .......................................... 360/51
(58) Field of Classification Search .................. None
See application file for complete search history.

(56) References Cited

U.S. PATENT DOCUMENTS

| 6,583,944 | B1 | 6/2003 | Wilson et al. | 360/51 |
| 6,947,243 | B2* | 9/2005 | Dang et al. | 360/75 |
| 2006/0082914 | A1* | 4/2006 | Miyashita | 360/51 |
| 2006/0203371 | A1* | 9/2006 | Abe et al. | 360/51 |

FOREIGN PATENT DOCUMENTS

| JP | 3-073406 | 3/1991 |
| JP | 10-241309 | 9/1998 |
| JP | 2000-123509 | 4/2000 |
| JP | 2002-133771 | 5/2002 |
| JP | 2004-199770 | 7/2004 |

* cited by examiner

*Primary Examiner*—William J. Klimowicz
*Assistant Examiner*—Dan I Davidson
(74) *Attorney, Agent, or Firm*—Greer, Burns & Crain, Ltd.

(57) ABSTRACT

A calculating unit calculates an interval time from a detection of a servo sync mark until a detection of an adjacent servo sync mark, for all servo sync marks on a track of a disk-shaped recording medium. A measuring unit measures, based on the calculated interval time, a deviation amount between a link interval time that represents the interval time between a servo sync mark recorded first and a servo sync mark recorded last and an ideal interval time that represents the link interval time when it is assumed that all the servo sync marks on the track are written at equal intervals.

12 Claims, 10 Drawing Sheets

FIG.1
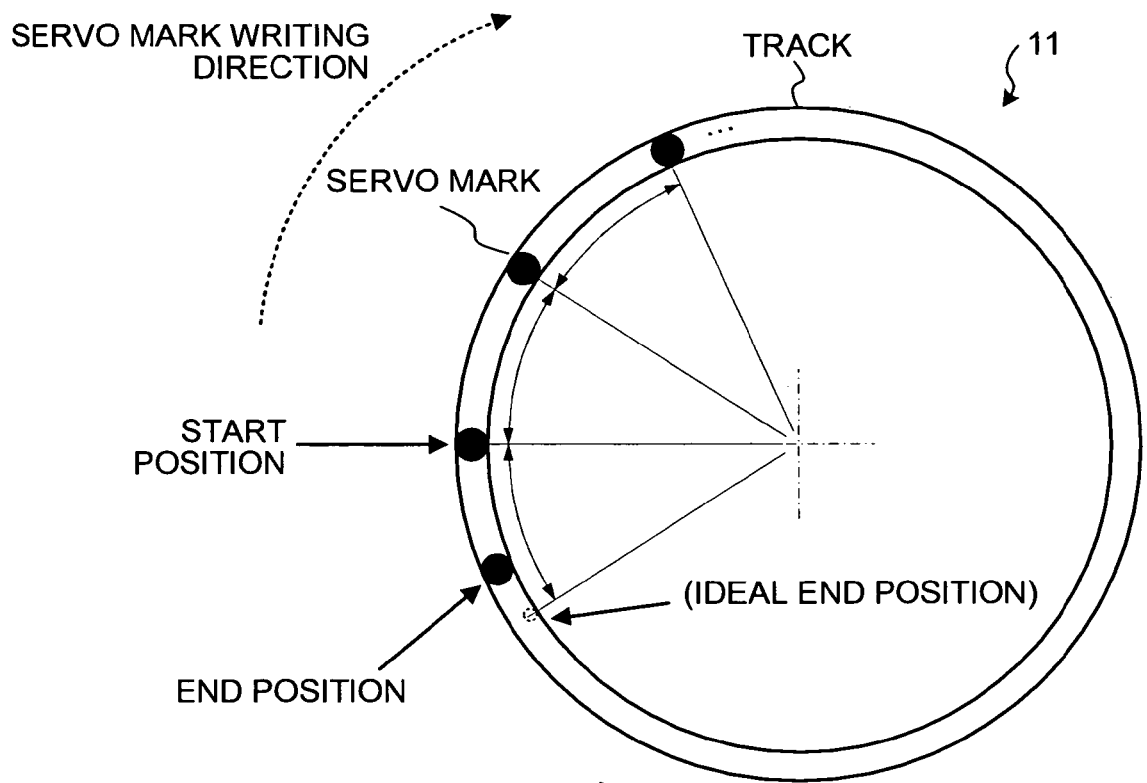
(1) SERVO MARK INTERVAL TIME CALCULATION
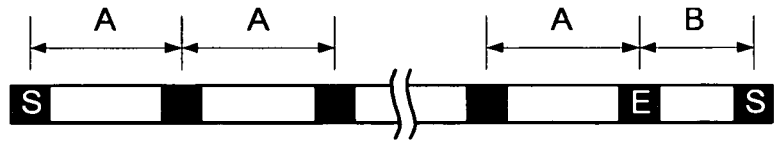
(2) MEASURE DEVIATION AMOUNT (A-B)
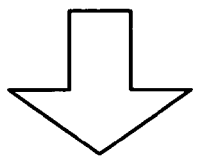
(3) CORRECT SERVO MARK DETECTION TIMING WITH DEVIATION AMOUNT AS PREMISE

STORAGE APPARATUS, STORAGE APPARATUS CONTROL METHOD, AND COMPUTER PRODUCT

BACKGROUND OF THE INVENTION

1. Field of the Invention

The present invention relates to a technology for performing data input/output with respect to a recording medium by detecting a servo sync mark used for positioning of a head.

2. Description of the Related Art

In a storage apparatus that performs data input/output with respect to a disk-shaped (circular) recording medium, such as a hard disk device, a plurality of tracks are formed on the recording medium at the time of initialization, and servo sync marks serving as marks for data access on respective tracks are written at equal intervals. A data access to a desired data position is performed by detecting positions of the servo sync marks.

Because the servo sync marks are used as references for the data access, it is important to make writing intervals of the servo sync marks equal for improvement of a format efficiency and improvement of a success rate of the data access. However, even when servo sync marks intervals are calculated from the number of servo sync marks to be written on an identical track and a circumference of the track and the servo sync marks are written according to the calculated servo sync mark intervals, an interval between the servo sync mark written first and the servo sync mark written last (hereinafter, "link interval") largely deviates from other servo sync mark intervals. This is because deviation of the servo sync mark intervals due to unevenness of rotation of the recording medium is accumulated while the servo sync marks are written on the entire track.

A technology for suppressing such deviation of the link intervals by improving writing accuracy of the servo sync marks is proposed in Japanese Patent Application Laid-Open No. 2004-199770. This technology provides a second head for writing a reference clock separately from a head for writing servo sync marks and writing the servo sync marks based on the reference clock written by the second head.

Japanese Patent Application Laid-Open No. 2002-133771 discloses a disk synchronous write (DSW) system for improving a success rate of data access by correcting data access timing based on measured servo sync mark intervals, by assuming that servo sync mark intervals are unequal.

However, in the technology disclosed in Japanese Patent Application Laid-Open No. 2004-199770, it is necessary to provide the two heads in a storage apparatus. This is disadvantageous in terms of manufacturing cost and a size compared with a normal storage apparatus having one head. When a recording medium having the servo sync marks is built in a storage apparatus at the time of manufacturing, it is impossible to apply this technology. This is because, even when servo sync marks are equally written, reading intervals of the servo sync marks are not equal because of an influence of eccentricity of the recording medium.

Therefore, it is conceivable to eliminate the influence of eccentricity of the recording medium using the technology disclosed in Japanese Patent Application Laid-Open No. 2002-133771. However, the data access timing is corrected excessively because of an influence of deviation of the link intervals from an ideal interval (hereinafter, "link amount"). Therefore, a recording capacity of the recording medium decreases because of necessity for performing format processing taking into account the link amount. In the storage apparatus including the recording medium having the servo sync marks recorded in advance, a data access error tends to occur when the link amount exceeds a tolerance.

Therefore, it is desirable to realize a storage apparatus that can keep a sufficient recording capacity and can prevent occurrence of a data access error even when intervals of servo sync marks recorded in a recording medium are not equal and, in particular, when the link interval is present.

SUMMARY OF THE INVENTION

It is an object of the present invention to at least solve the problems in the conventional technology.

A storage apparatus according to one aspect of the present invention detects a servo sync mark written on a track of a disk-shaped recording medium to perform data input/output data with respect to the recording medium. The storage apparatus includes a calculating unit that calculates an interval time from a detection of a servo sync mark until a detection of an adjacent servo sync mark, for all servo sync marks on the track; and a measuring unit that measures, based on the calculated interval time, a deviation amount between a link interval time that represents the interval time between a servo sync mark recorded first and a servo sync mark recorded last and an ideal interval time that represents the link interval time when it is assumed that all the servo sync marks on the track are written at equal intervals.

A method according to another aspect of the present invention is for controlling a storage apparatus that detects a servo sync mark written on a track of a disk-shaped recording medium to perform data input/output data with respect to the recording medium. The method includes calculating an interval time from a detection of a servo sync mark until a detection of an adjacent servo sync mark, for all servo sync marks on the track; and measuring, based on the calculated interval time, a deviation amount between a link interval time that represents the interval time between a servo sync mark recorded first and a servo sync mark recorded last and an ideal interval time that represents the link interval time when it is assumed that all the servo sync marks on the track are written at equal intervals.

A computer-readable recording medium according to still another aspect of the present invention stores a computer program that caused a computer to execute the above method according to the present invention.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a schematic for illustrating an outline of a control method according to the present invention;

DETAILED DESCRIPTION OF THE PREFERRED EMBODIMENTS

Figure 2:
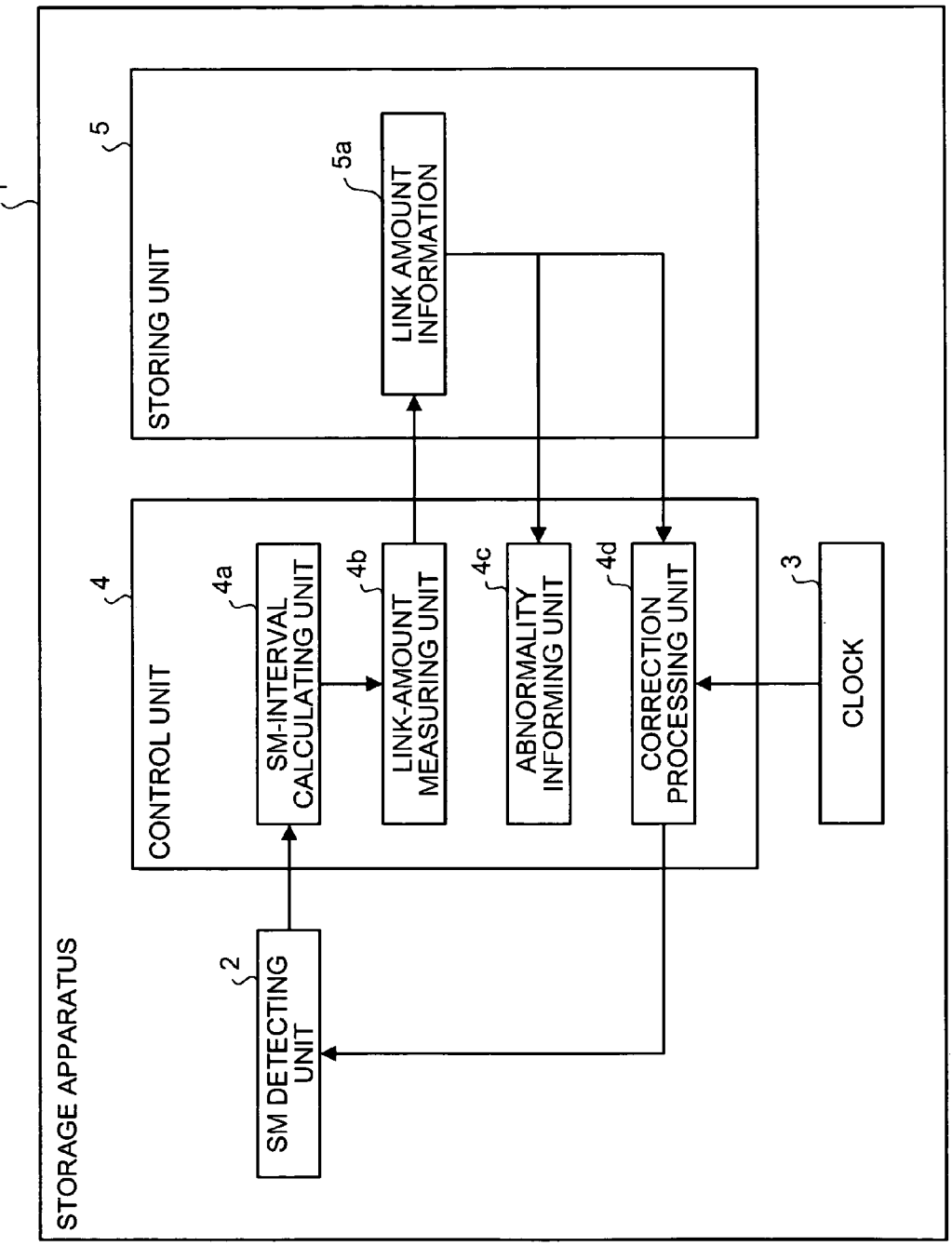
FIG. 2 is a block diagram of a storage apparatus according to an embodiment of the present invention.

Exemplary embodiments of the present invention are explained below in detail with reference to the accompanying drawings. In the following explanation, a control method according to the present invention is applied to a hard disk device.

FIG. 1 is a schematic for illustrating an outline of a control method according to the present invention. The servo sync marks are written on a recording medium (disk) used in a hard disk device in advance. The figure shows a track 11 from among a plurality of tracks provided in a concentric circle shape on the disk.

The servo sync marks are recorded on the track 11 of the disk at each ideal interval calculated by dividing a circumference of the track by the number of servo sync marks. However, even when it is attempted to record the servo sync marks at each ideal interval, an interval between a recording start position and a recording end position of the servo sync marks often deviates from the ideal interval because of an influence of unevenness of rotation of the disk.

When positions of the servo sync marks recorded in this way are detected to measure respective servo sync mark interval times, a result 12 is obtained. The respective servo sync mark interval times are measured at substantially equal intervals every time A from the servo sync mark in the start position S. However, an interval time between the servo sync mark in the end position E and the servo sync mark in the start position S largely deviates from the time A. In the following explanation, a portion between the start position S and the end position E is referred to as a "link point" and an interval of such a portion is referred to as a "link interval".

In the control method according to the present invention, the respective servo sync mark interval times are calculated based on the servo sync marks measured to calculate a difference between the link interval and the ideal interval (hereinafter, "link amount). Servo sync mark detection timing is corrected with the link amount as a premise. Consequently, an influence of the link point is eliminated.

In the control method according to the present invention, when it is found that a measured link interval exceeds a tolerance of correction processing, an abnormality is informed. This makes it possible to eliminate a hard disk device including a disk having an abnormal link interval at a stage when disks having servo sync marks recorded therein in advance are built in hard disk devices to carry out an operation test. Therefore, it is possible to prevent an outflow of an apparatus that is likely to frequently cause a data access error due to the abnormal link interval to the market.

When a disk having servo sync marks recorded therein in advance is built in a hard disk device, a physical center position of the disk and an attachment position of the disk often deviate from each other (are eccentric). When such eccentricity is present, servo sync mark intervals are measured as unequal intervals even when the respective servo sync marks are recorded at ideal intervals. When the intervals of the servo sync marks are unequal, timing of access to data areas provided among the respective servo sync marks shifts. Thus, it is necessary to provide buffer areas separately from the data areas in areas among the respective servo sync marks. This causes deterioration in format efficiency. In other words, since it is impossible to use the buffer areas as the data areas, useless areas are present.

As a correction system for correcting an error due to such eccentricity, a disk synchronous write (DSW) system is conventionally used. The DSW system is a technology for correcting data access timing based on a measured servo sync mark interval and improving a success rate of data access.

However, when the link amount exceeds a predetermined value, in the DSW system, wrong correction is performed because of an influence of the link amount. Thus, it is necessary to secure the buffer areas extra. This makes it impossible to sufficiently improve format efficiency. If the control method is used together with the DSW system, it is possible to effectively eliminate the influence of the link amount. This makes it possible to improve format efficiency and improve a storage apparatus capacity of the data areas or the like.

Even if the buffer areas are small areas, a volume of data that can be recorded in the areas increases according to the recent increase in recording density. Thus, such buffer areas are not neglectable any more. Therefore, even if an amount of reduction of the buffer areas is small, a significant improvement of the recording capacity is expected when the buffer areas are reduced in all the tracks.

FIG. 2 is a block diagram of a storage apparatus 1 according to an embodiment of the present invention. In the figure, only components related to processing for correcting servo sync mark detection timing based on a measured link amount are extracted out of functions provided in the storage apparatus 1.

The storage apparatus 1 includes a servo sync mark (SM) detecting unit 2, a clock 3, a control unit 4, and a storing unit 5. The control unit 4 includes a servo sync mark (SM) interval calculating unit 4a, a link-amount measuring unit 4b, an abnormality informing unit 4c, and a correction processing unit 4d. The storing unit 5 stores link amount information 5a. Various kinds of processing in the control unit 4 are executed by programs such as firmware provided in the storage apparatus 1.

The SM detecting unit 2 performs processing for detecting servo sync marks on respective tracks via a head for disk access and passing detection information to the SM interval calculating unit 4a of the control unit 4. The SM detecting unit 2 performs processing for changing servo sync mark detection timing according to an instruction of the correction processing unit 4d of the control unit 4. The clock 3 is a device for generating a reference clock used for determining various kinds of operation timing of the storage apparatus 1.

The control unit 4 is a processing unit that calculates servo sync mark intervals on the respective tracks based on the servo sync mark detection information acquired from the SM detecting unit 2, measures a link amount at a link point based on the servo sync mark intervals calculated, and performs correction processing or abnormality informing processing based on the link amount measured.

The SM interval calculating unit 4a performs processing for calculating servo sync mark intervals on the respective tracks based on the servo sync mark information acquired from the SM detecting unit 2 and passing the servo sync mark intervals calculated to the link-amount measuring unit 4b.

Figure 3:
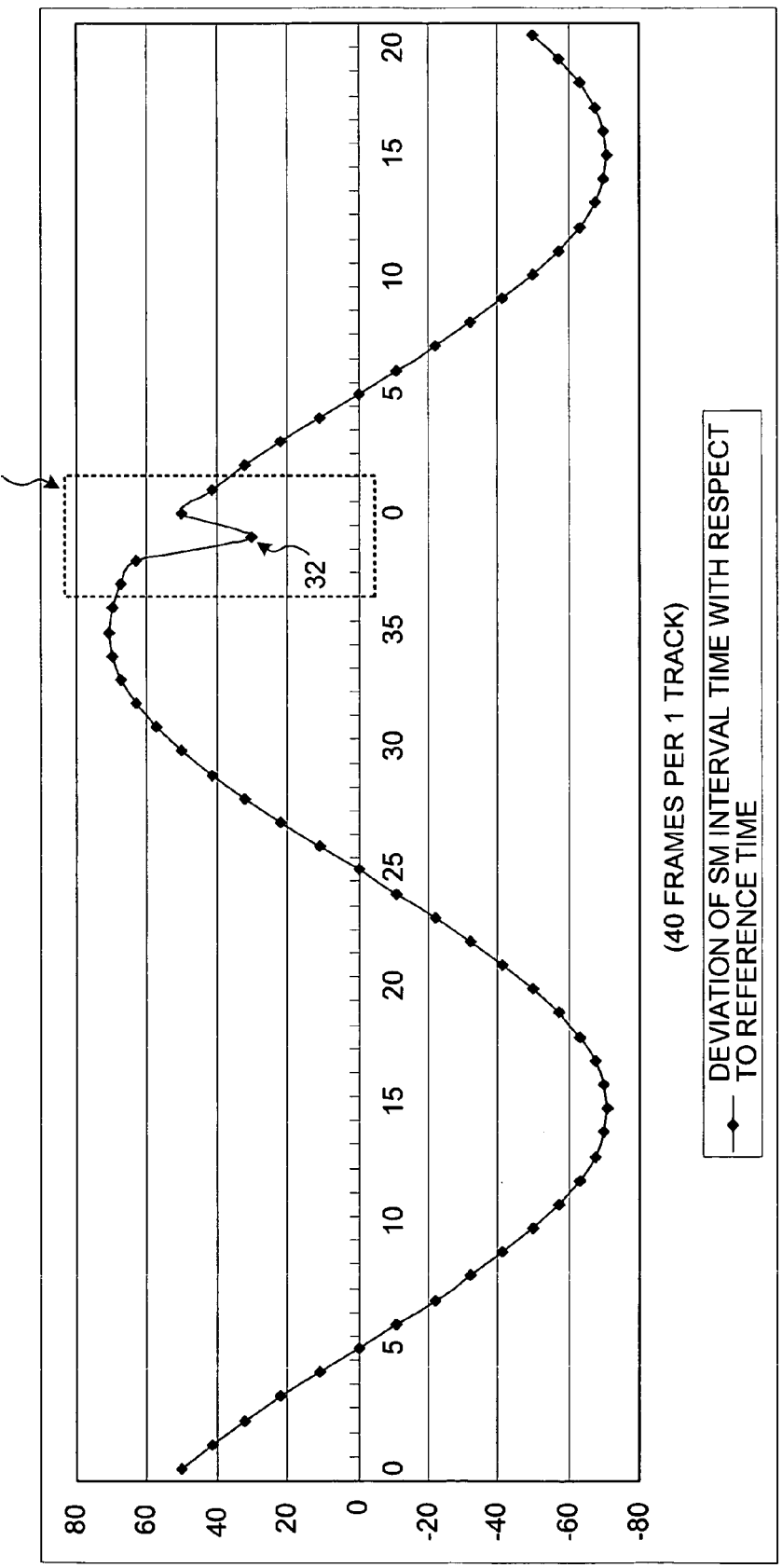
FIG. 3 is graph of deviation of a link point before correction.
Figure 4:
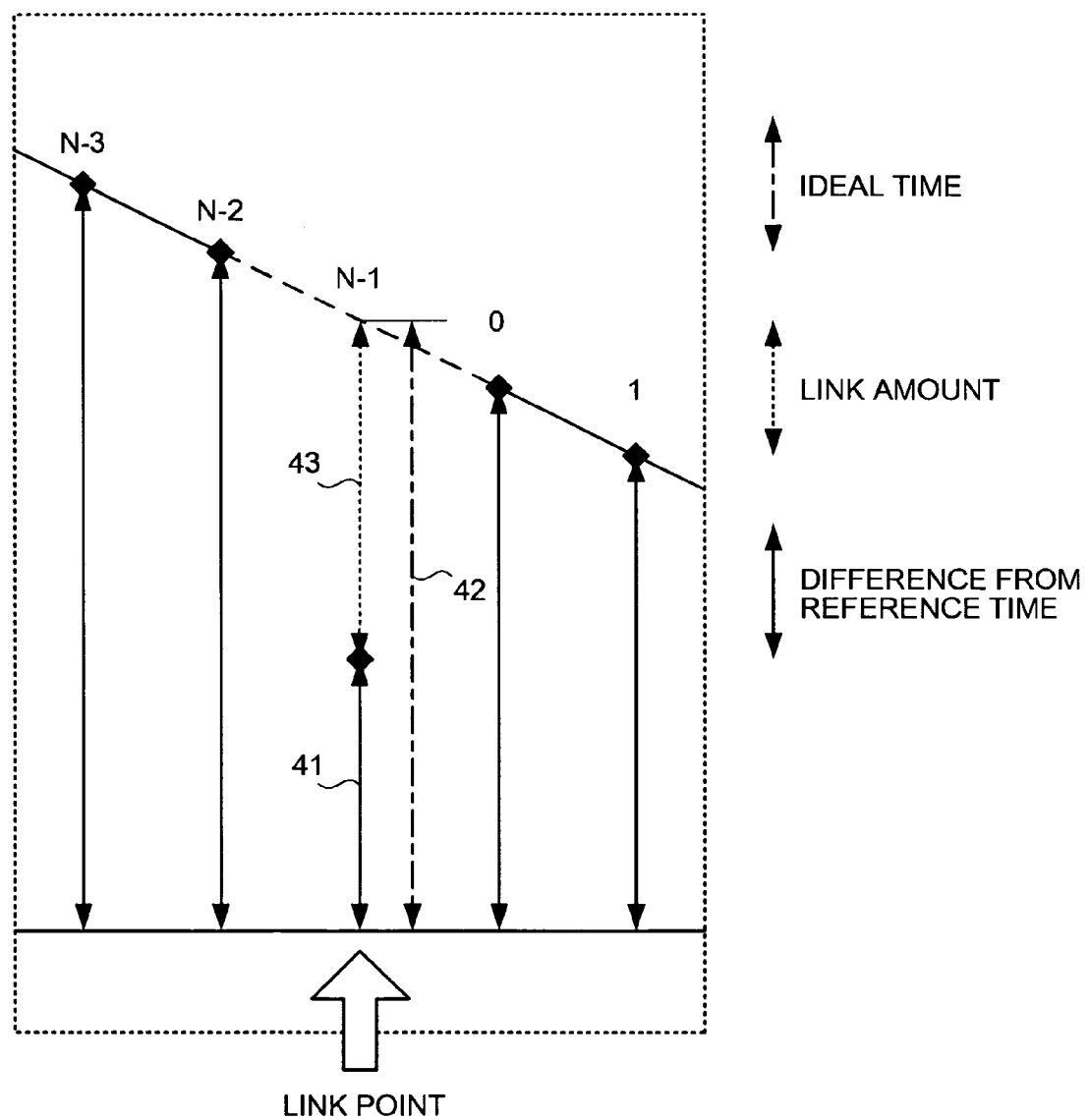
FIG. 4 is a diagram for explaining details of the link point shown in FIG. 3.

FIG. 3 is graph of deviation of a link point before correction. FIG. 4 is a diagram for explaining details of the link point shown in FIG. 3.

A vertical axis in FIG. 3 indicates a deviation amount from the ideal interval and a horizontal axis indicates respective servo sync marks on a track. In the figure, forty servo sync marks are recorded on one track. A deviation amount of the ideal interval changes along a shape of a sine curve. This is caused by eccentricity of a disk.

A point 32 indicates a deviation amount of a servo sync mark interval at a link point 31. The deviation amount from the ideal interval often changes excessively at the link point 31.

As shown in FIG. 4, a difference 41 from a reference time at the link point largely deviates from values at points before and after the link point. The link-amount measuring unit 4b described later calculates an ideal time 42 from the values at the points before and after the link point (e.g., values at "N–1" and "0" in FIG. 4) and measures a link amount 43 by subtracting the value at the link point from the ideal time.

The link-amount measuring unit 4b performs a processing for measuring the link amount based on the servo sync mark intervals received from the SM interval calculating unit 4a and causing the storing unit 5 to store the link amount information 5a including the link amount measured.

The abnormality informing unit 4c performs processing for reading out the link amount information 5a from the storing unit 5, and informs, when a link information included in the link amount information 5a read out exceeds a predetermined value, that a disk is abnormal. Such a predetermined value may be included in the link amount information 5a and stored in the storing unit 5 or may be held by the abnormality informing unit 4c as a fixed value. The abnormality informing unit 4c may directly receive the link amount information 5a from the link-amount measuring unit 4b rather than reading out the link amount information 5a from the storing unit 5.

The correction processing unit 4d reads out the link amount information 5a from the storing unit 5 and corrects servo sync mark detection timing based on the link amount included in the link amount information 5a read out. The correction processing unit 4d executes correction processing for the servo sync mark detection timing after correcting the link amount at the link point explained with reference to FIGS. 3 and 4.

Figure 5:
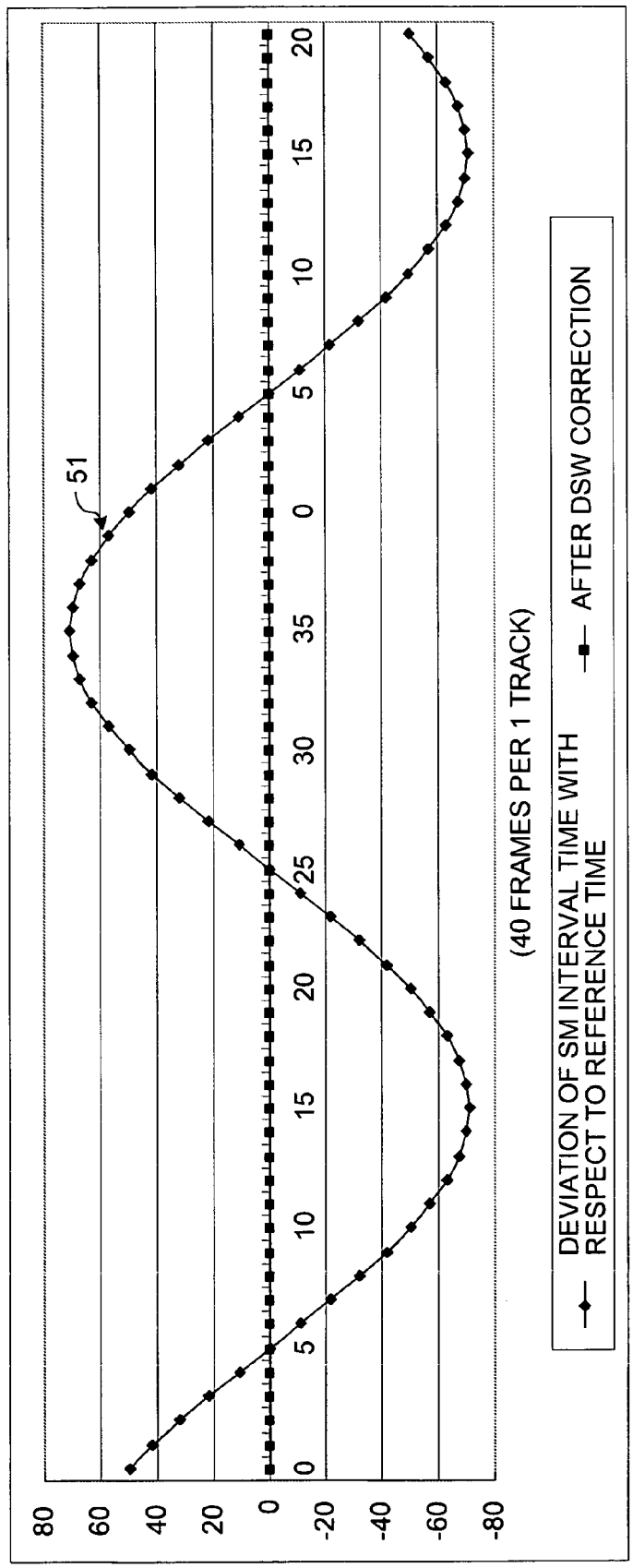
FIG. 5 is a graph of a link point after correction.

FIG. 5 is a graph of a link point after correction. A value 51 at the link point is corrected to be a value following changes in values at points before and after the link point. A value after DSW correction is shown in the figure. A deviation amount from the ideal interval due to eccentricity of a disk or the like is corrected to a value near zero over the entire track by performing the DSW correction.

According to the present embodiment, it is possible to select two kinds of methods as a method of changing the servo sync mark detection timing based on the link amount measured by the link-amount measuring unit 4b. One is a method of stopping a clock used for servo sync mark detection according to circumstances (see FIG. 6) and the other is a method of changing an interval of such a clock according to circumstances (see FIG. 7).

Figure 6:
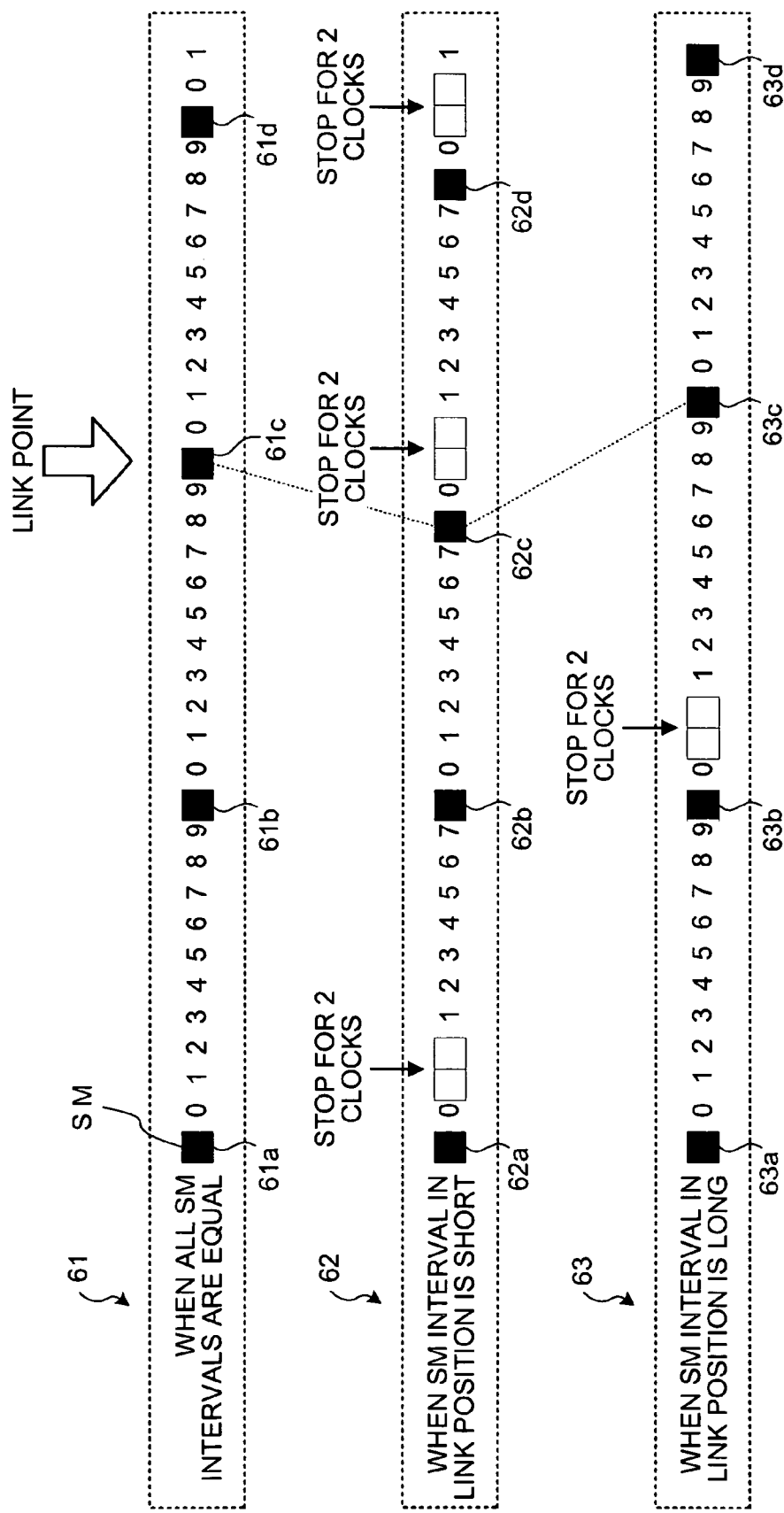
FIG. 6 is a schematic for illustrating a correction process according to clock stop.

FIG. 6 is a schematic for illustrating a correction process according to clock stop. Intervals of respective servo sync marks are ten clocks and a link amount measured by the link-amount measuring unit 4b is equivalent to two clocks.

In a state of the clocks shown in a section 61, all servo sync marks (61a to 61d) are written at equal intervals. Intervals of the respective servo sync marks are ten clocks (0 to 9).

In a state of clock control shown in a section 62, a servo sync mark interval in a link position (at a link point) is shorter than other servo sync mark intervals. An interval between 62 and 62b and an interval between 62c and 62d are ten clocks. However, an interval at a link point (a part between 61b and 62c) is eight clocks (0 to 7). According to the present embodiment, the following procedure is adopted to correct a difference of two clocks between the intervals.

At points other than the link point, clock stop for two clocks (10–8) is performed. At the link point, clock stop is not performed. In the section 62, for ease of explanation, clock stop is not performed at the link point. However, it is also possible that a tolerance corresponding to a link amount is provided and clock stop is performed for a difference between the tolerance and the number of clocks corresponding to the link amount.

Specifically, when the tolerance corresponding to the link amount is set to three clocks, clock stop for one clock (3–2) is performed at the link point and clock stop for three clocks is performed at the other points. This makes it easy to execute the correction processing when the link amount is within the tolerance and execute the abnormality informing processing when the link amount exceeds the tolerance.

In a state of clock control shown in a section 63, a servo sync mark interval in a link position (at a link point) is longer than other servo sync mark intervals. An interval between 63a and 63b and an interval between 63c and 63d are ten clocks. However, an interval at a link point (a part between 63b and 63c) is twelve clocks. According to the present embodiment, the following procedure is adopted to correct a difference of two clocks between the intervals.

At points other than the link point, clock stop is not performed. At the link point, clock stop for two clocks (12–10) is performed. In the section 63, for ease of explanation, clock stop is not performed at the points other than the link point. However, it is also possible that a tolerance corresponding to a link amount is provided and clock stop is performed for a difference between the tolerance and the number of clocks corresponding to the link amount.

Specifically, when the tolerance corresponding to the link amount is set to three clocks, clock stop for five clocks (3+2) is performed at the link point and clock stop for three clocks is performed at the other points. This makes it easy to execute the correction processing when the link amount is within the tolerance and execute the abnormality informing processing when the link amount exceeds the tolerance.

Figure 7:
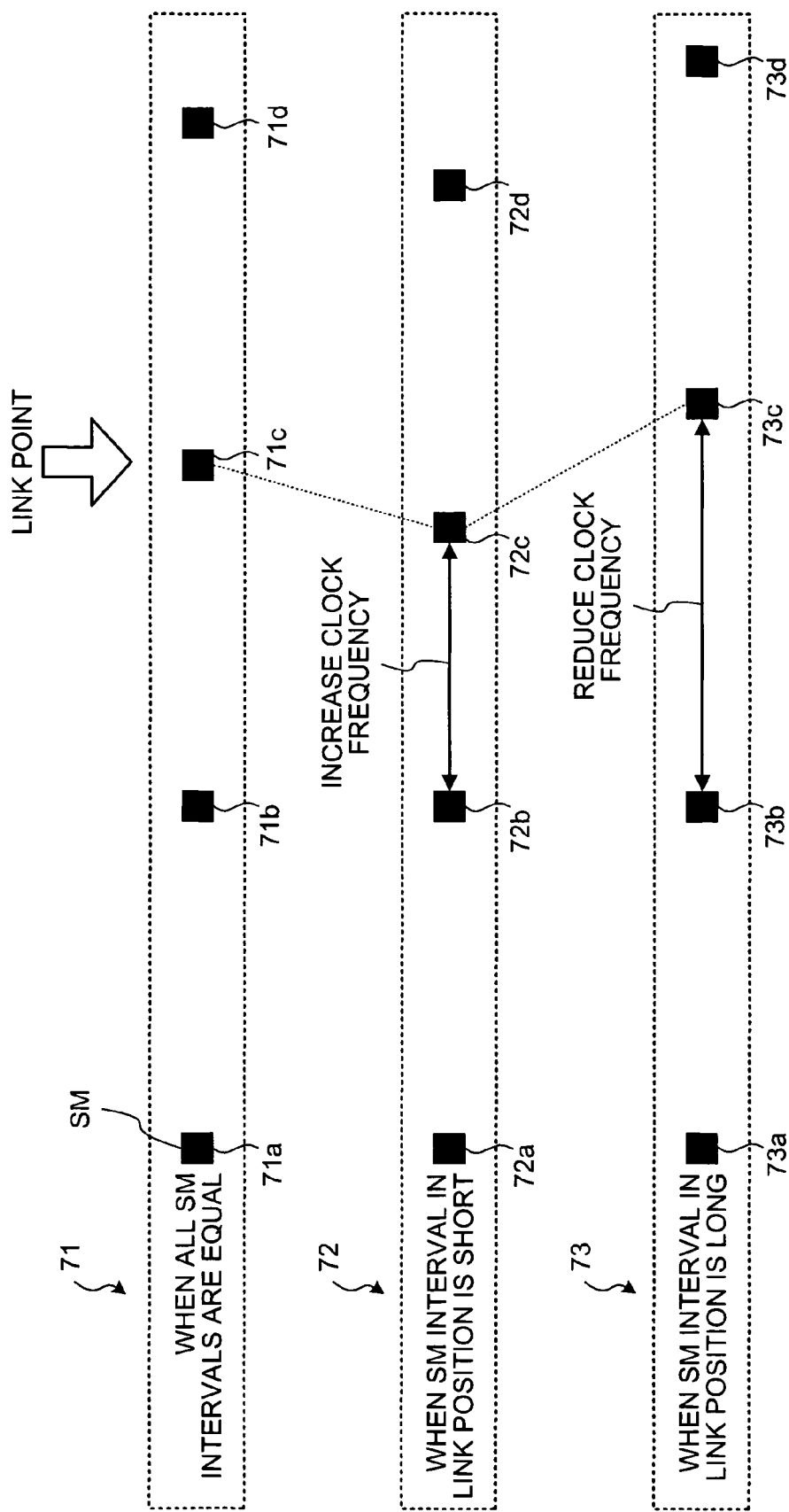
FIG. 7 is a schematic for illustrating a correction process according to clock interval change.

FIG. 7 is a schematic for illustrating a correction process according to clock interval change. In a section 71, it is assumed that all servo sync marks (71a to 71d) are written at equal intervals. In this case, the correction processing is not performed. In a state of clock control shown in a section 72, a servo sync mark interval in a link position (at a link point) is shorter than other servo sync mark intervals. In a state of clock control shown in a section 73, a servo sync mark interval in a link position (at a link point) is longer than other servo sync mark intervals.

As shown in the section 72, a servo sync mark interval at a link point (a part between 72b and 72c) is shorter than the other servo sync mark intervals). The correction processing unit 4d controls servo sync mark detection timing by increasing a clock frequency at the link point. For example, when a servo sync mark interval at the link point is 8 and a servo sync mark interval at the other points is 10, the correction processing unit 4d multiplies the frequency at the link point by 10/8.

As shown in the section 73, a servo sync mark interval at a link point (a part between 73b and 73c) is longer than the other servo sync mark intervals. The correction processing unit 4d controls servo sync mark detection timing by decreasing a clock frequency at the link point. For example, when a servo sync mark interval at the link point is 12 and a servo sync mark interval at the other points is 10, the correction processing unit 4d multiplies the frequency at the link point by 10/12.

The storing unit 5 includes a storage apparatus device such as a nonvolatile random access memory (RAM) and stores the link amount information 5a. The link amount information 5a is information including a link amount measured by the link-amount measuring unit 4b and information incidental to the link amount (e.g., a position of a link point).

Figure 8:
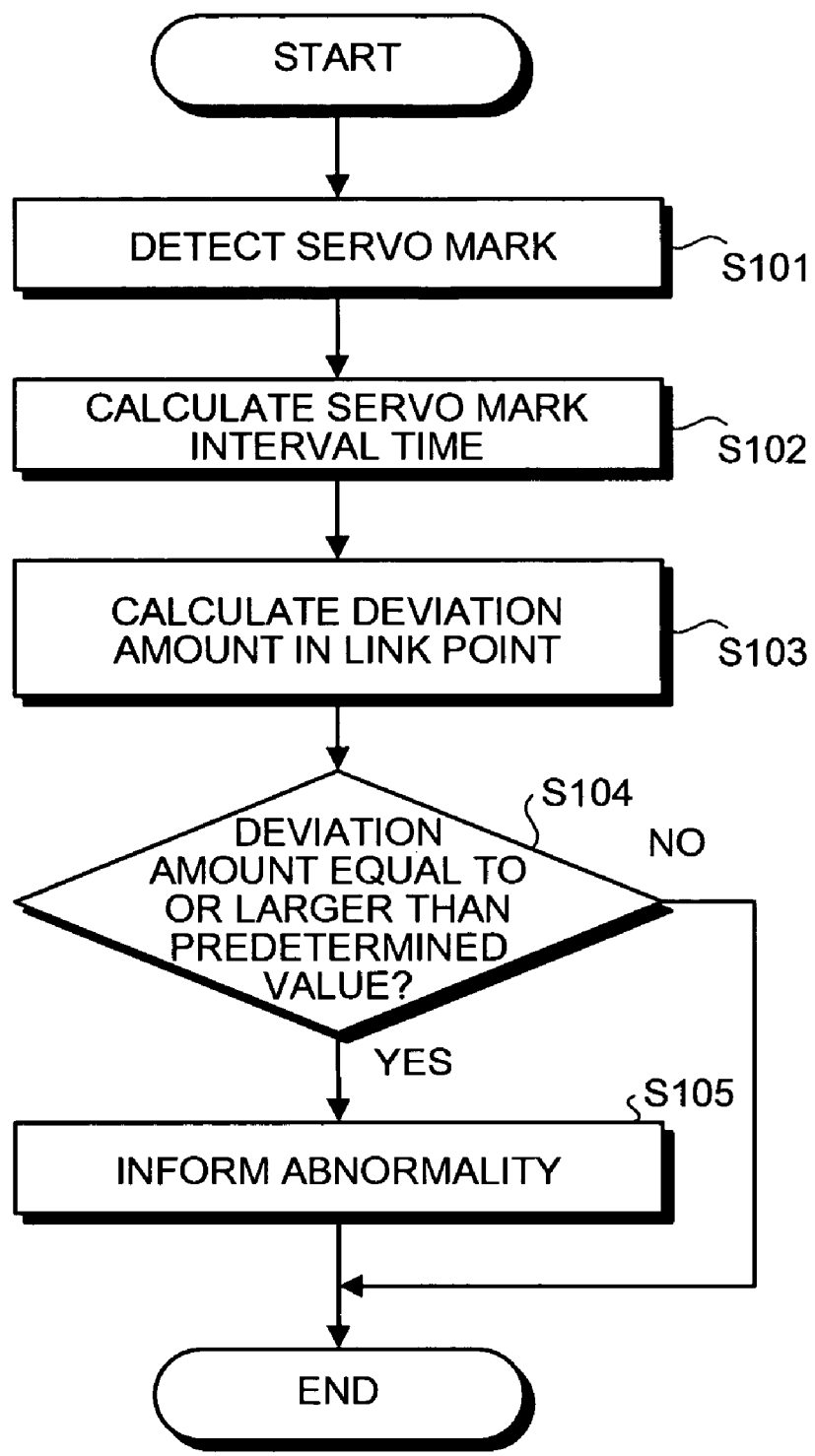
FIG. 8 is a flowchart of a processing procedure for an abnormality informing processing.

FIG. 8 is a flowchart of a processing procedure for an abnormality informing processing. When the SM detecting unit 2 detects respective servo sync marks on a track (step S101), the SM interval calculating unit 4a calculates a servo sync mark interval time based on information on the servo sync marks detected by the SM detecting unit 2 (step S102).

When the link-amount measuring unit 4b measures a deviation amount at the link point (a link amount) (step S103) and stores the link amount in the storing unit 5, the abnormality informing unit 4c acquires the link amount from the storing unit 5 and judges whether the link amount acquired is equal to or larger than a predetermined value (step S104). When the link amount is equal to or larger than the predetermined value ("Yes" at step S104), the abnormality informing unit 4c informs abnormality and ends the processing. When the link amount is less than the predetermined value ("No" at step S104), the abnormality informing unit 4c ends the processing without informing abnormality.

The abnormality informing unit 4c reads out the link amount stored in the storing unit 5 by the link-amount measuring unit 4b. However, the link-amount measuring unit 4b may directly pass the link amount measured to the abnormality informing unit 4c.

Figure 9:
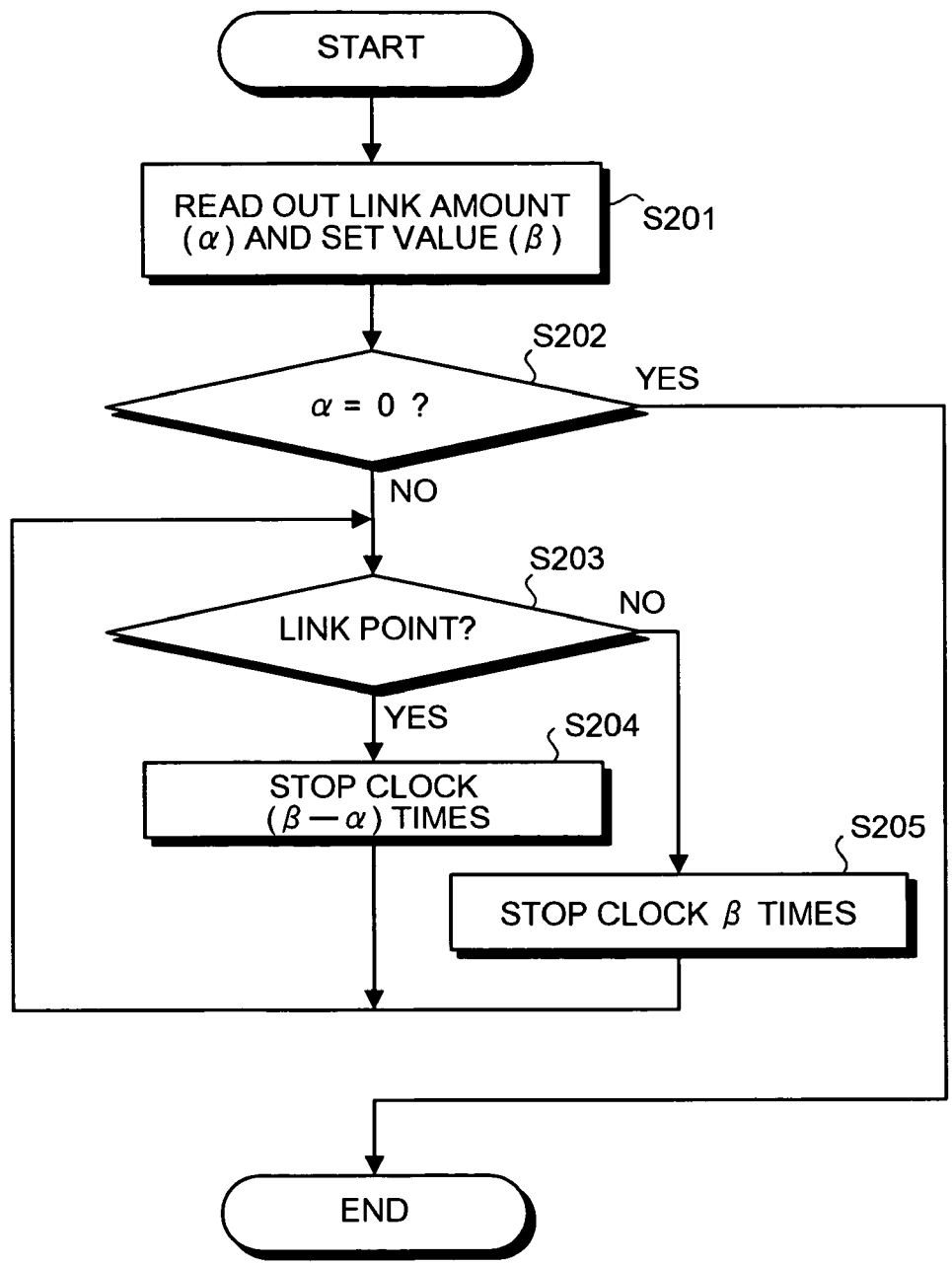
FIG. 9 is a flowchart of a processing procedure for the correction processing according to the clock stop.
Figure 10:
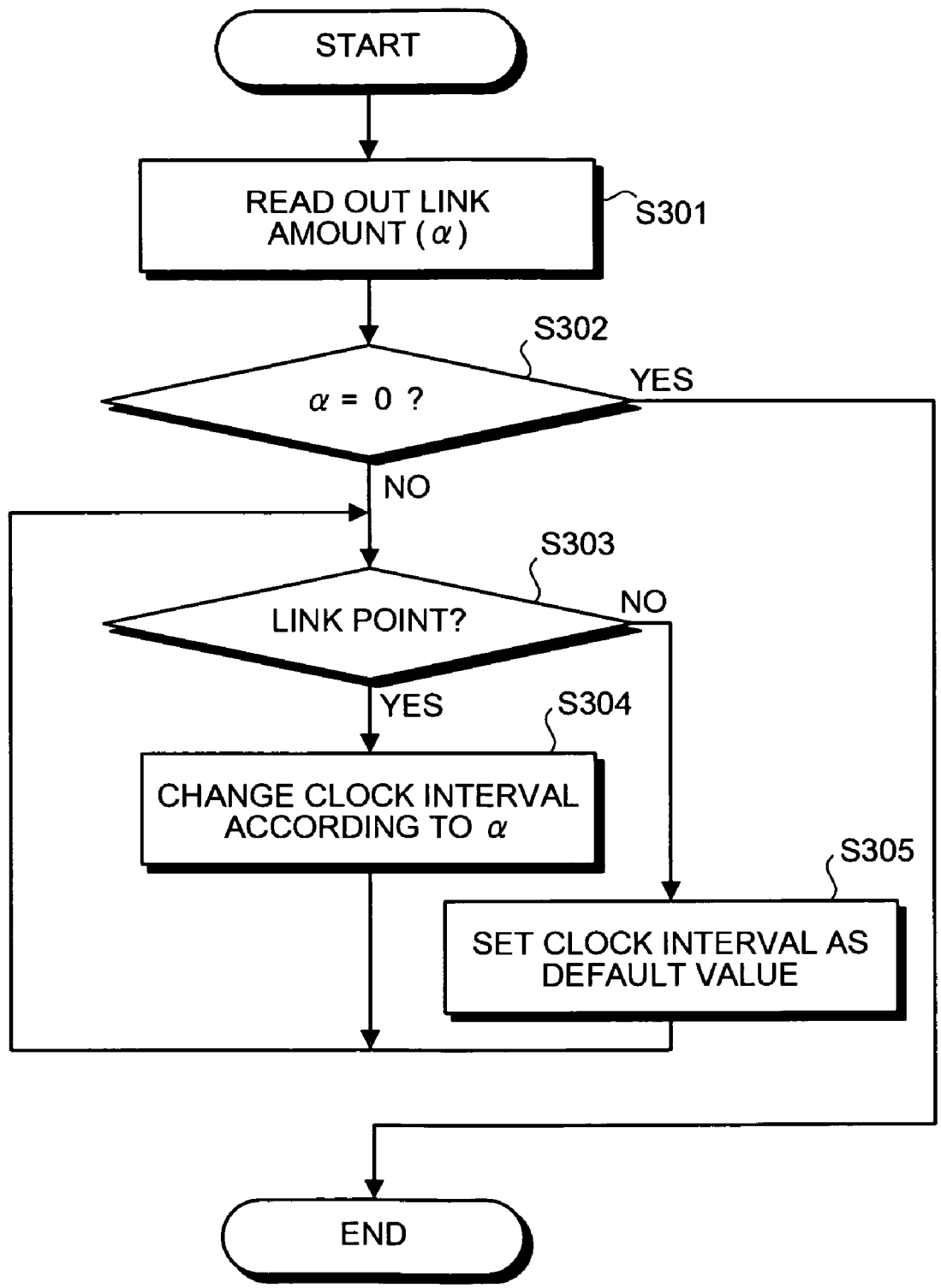
FIG. 10 is a flowchart of a processing procedure for the correction processing according to the clock interval change.

FIG. 9 is a flowchart of a processing procedure for the correction processing according to the clock stop. FIG. 10 is a flowchart of a processing procedure for the correction processing according to the clock interval change.

As shown in FIG. 9, the correction processing unit 4d reads out a link amount ($\alpha$) and a set value ($\beta$) included in the link amount information 5a of the storing unit 5 (step S201) and judges whether the link amount ($\alpha$) read out is 0 (step S202). When the link amount ($\alpha$) is 0 ("Yes" at step S202), the correction processing unit 4d ends the processing without performing correction. The set value ($\beta$) indicates the tolerance used in the explanation of FIG. 6.

When the link amount ($\alpha$) is not 0 ("No" at step S202), the correction processing unit 4d judges whether an access position is a link point (step S203). When the access position is the link point ("Yes" at step S203), the correction processing unit 4d stops a clock ($\beta$–$\alpha$) times (step S204) and repeats the processing at step S203 and the subsequent steps to access the next access position.

On the other hand, when the access position is not the link point ("No" at step S203), the correction processing unit 14d stops the clock $\beta$ times (step S205) and repeats the processing at step S203 and the subsequent steps to access the next access position.

As shown in FIG. 10, the correction processing unit 4d reads out the link amount ($\alpha$) included in the link amount information 5a of the storing unit 5 (step S301) and judges whether the link amount ($\alpha$) read out is 0 (step S302). When the link amount ($\alpha$) is 0 ("Yes" at step S302), the correction processing unit 4d ends the processing without performing correction.

When the link amount ($\alpha$) is not 0 ("No" at step S302), the correction processing unit 4d judges whether an access position is a link point (step S303). When the access position is the link point ("Yes" at step S303), the correction processing unit 4d changes a clock interval according to the link amount ($\alpha$) and repeats the processing at step S303 and the subsequent steps. On the other hand, when the access position is not the link point ("No" at step S303), the correction processing unit 4d repeats the processing at step S303 and the subsequent steps after setting the clock interval as a default value.

As described above, according to the present embodiment, the SM interval calculating unit calculates intervals of servo sync marks on a track, the link-amount measuring unit measures a link amount at a link point and causes the storing unit to store the link amount, the abnormality informing unit informs abnormality when such a link amount is equal to or larger than a predetermined value, and the correction processing unit performs correction processing by changing servo sync mark detection timing according to the link amount. When the correction processing unit changes the servo sync mark detection timing, the correction processing unit performs stop or interval change for a reference clock. Therefore, even when servo sync mark intervals stored in a recording medium are not equal, in particular, when a link interval is present, it is possible to keep a sufficient recording capacity. Since it is possible to efficiently detect a recording medium in which a link amount exceeds a tolerance, it is possible to prevent outflow of a product having abnormality to the market.

According to the present invention, it is possible to keep a sufficient recording capacity and prevent occurrence of a data access error even when intervals of the servo sync marks recorded in the recording medium are not equal and, in particular, when a link interval of the servo sync marks is present.

Furthermore, according to the present invention, it is possible to effectively prevent an outflow of a storage apparatus including a recording medium having abnormality to the market when a deviation amount of a link interval exceeds a tolerance of correction processing.

Moreover, according to the present invention, it is possible to improve format efficiency and improve a recording capacity of the recording medium even when a deviation amount of the link interval is present.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A storage apparatus that detects a servo sync mark written on a track of a disk-shaped recording medium to perform data input/output data with respect to the recording medium, the storage apparatus comprising:

a calculating unit that calculates an interval time from a detection of a servo sync mark until a detection of an adjacent servo sync mark, for all servo sync marks on the track;

a measuring unit that measures, based on the calculated interval time, a deviation amount between a link interval time that represents the interval time between a servo sync mark recorded first and a servo sync mark recorded last and an ideal interval time that represents the link interval time when all the servo sync marks on the track are written at equal intervals; and a correcting unit that corrects a timing for detecting the servo sync mark when performing the data input/output, by correcting the link interval time, with which the deviation amount is measured, using interval times before and after the link interval time.

2. The storage apparatus according to claim 1, further comprising:
- a judging unit that judges whether the measured deviation amount exceeds a predetermined value; and
- an informing unit that informs, when the judging unit judges that the measured deviation amount exceeds the predetermined value, an abnormality of the recording medium.

3. The storage apparatus according to claim 1, wherein the correcting unit corrects the timing by stopping a clock for detecting the timing by a predetermined number of times, based on the deviation amount.

4. The storage apparatus according to claim 1, wherein the correcting unit corrects the timing by changing an interval of a clock for detecting the timing by a predetermined number of times, based on the deviation amount.

5. A method of controlling a storage apparatus that detects a servo sync mark written on a track of a disk-shaped recording medium to perform data input/output data with respect to the recording medium, the method comprising:
- calculating an interval time from a detection of a servo sync mark until a detection of an adjacent servo sync mark, for all servo sync marks on the track;
- measuring, based on the calculated interval time, a deviation amount between a link interval time that represents the interval time between a servo sync mark recorded first and a servo sync mark recorded last and an ideal interval time that represents the link interval time when all the servo sync marks on the track are written at equal intervals; and
- correcting a timing for detecting the servo sync mark when the storage apparatus performing the data input/output, by correcting the link interval time, with which the deviation amount is measured, using interval times before and after the link interval time.

6. The method according to claim 5, further comprising:
- judging whether the measured deviation amount exceeds a predetermined value; and
- informing, when it is judged that the measured deviation amount exceeds the predetermined value at the judging, an abnormality of the recording medium.

7. The method according to claim 5, wherein the correcting includes correcting the timing by stopping a clock for detecting the timing by a predetermined number of times, based on the deviation amount.

8. The method according to claim 5, wherein the correcting includes correcting the timing by changing an interval of a clock for detecting the timing by a predetermined number of times, based on the deviation amount.

9. A computer-readable recording medium that stores a computer program for controlling a storage apparatus that detects a servo sync mark written on a track of a disk-shaped recording medium to perform data input/output data with respect to the recording medium, wherein the computer program causes a computer to execute:
- calculating an interval time from a detection of a servo sync mark until a detection of an adjacent servo sync mark, for all servo sync marks on the track;
- measuring, based on the calculated interval time, a deviation amount between a link interval time that represents the interval time between a servo sync mark recorded first and a servo sync mark recorded last and an ideal interval time that represents the link interval time when all the servo sync marks on the track are written at equal intervals; and
- correcting a timing for detecting the servo sync mark when the storage apparatus performing the data input/output, by correcting the link interval time, with which the deviation amount is measured, using interval times before and after the link interval time.

10. The computer-readable recording medium according to claim 9, wherein the computer program further causes the computer to execute:
- judging whether the measured deviation amount exceeds a predetermined value; and
- informing, when it is judged that the measured deviation amount exceeds the predetermined value at the judging, an abnormality of the recording medium.

11. The computer-readable recording medium according to claim 9, wherein the correcting includes correcting the timing by stopping a clock for detecting the timing by a predetermined number of times, based on the deviation amount.

12. The computer-readable recording medium according to claim 9, wherein the correcting includes correcting the timing by changing an interval of a clock for detecting the timing by a predetermined number of times, based on the deviation amount.

* * * * *